(12) United States Patent
Montaigne et al.

(10) Patent No.: US 10,526,162 B2
(45) Date of Patent: Jan. 7, 2020

(54) METHOD FOR CONTROLLING ROTATION OF A WINDING SPOOL OF A PROOF-TESTING MACHINE FOR OPTICAL FIBER, CORRESPONDING SYSTEM, COMPUTER PROGRAM PRODUCT AND NON-TRANSITORY COMPUTER-READABLE CARRIER MEDIUM

(71) Applicant: Draka Comteq BV, Amsterdam (NL)

(72) Inventors: Nelly Montaigne, Paron (FR); Paul Shirley, Paron (FR); Philippe Marle, Paron (FR); Sebastien Milleville, Paron (FR)

(73) Assignee: DRAKA COMTEQ BV, Amsterdam (NL)

( * ) Notice: Subject to any disclaimer, the term of this patent is extended or adjusted under 35 U.S.C. 154(b) by 247 days.

(21) Appl. No.: 15/546,748

(22) PCT Filed: Feb. 13, 2015

(86) PCT No.: PCT/IB2015/000349
§ 371 (c)(1),
(2) Date: Jul. 27, 2017

(87) PCT Pub. No.: WO2016/128784
PCT Pub. Date: Aug. 18, 2016

(65) Prior Publication Data
US 2018/0022569 A1   Jan. 25, 2018

(51) Int. Cl.
*B65H 63/036* (2006.01)
*B65H 59/38* (2006.01)
*G01M 11/08* (2006.01)

(52) U.S. Cl.
CPC ......... *B65H 59/385* (2013.01); *B65H 63/036* (2013.01); *G01M 11/088* (2013.01); *B65H 2701/32* (2013.01)

(58) Field of Classification Search
CPC ................ B65H 59/385; B65H 63/036; B65H 2701/32; G01M 11/088
See application file for complete search history.

(56) References Cited

U.S. PATENT DOCUMENTS

| 5,073,179 A | * | 12/1991 | Yoshimura | ........... C03B 37/0253 65/163 |
| 5,322,228 A | * | 6/1994 | Nagayama | ............. B65H 54/88 242/476.6 |
| 2011/0198766 A1 | * | 8/2011 | Koshimizu | ............ B65H 51/10 264/2.7 |

FOREIGN PATENT DOCUMENTS

| JP | 2004059243 A | 2/2004 |
| JP | 3511614 B2 | 3/2004 |

(Continued)

OTHER PUBLICATIONS

International Preliminary Report on Patentability dated Aug. 15, 2017 (11 pages).

(Continued)

*Primary Examiner* — Sang K Kim
(74) *Attorney, Agent, or Firm* — Shumaker, Loop & Kendrick, LLP

(57) ABSTRACT

The invention relates to a method for controlling rotation of a winding spool onto which an optical fiber is wound in a proof-testing machine. The optical fiber is guided in the proof-testing machine at a given line speed from an input pulling device to an output pulling device and then to the spool. The input and output pulling device is arranged to subject the optical fiber to a predetermined tensile stress. The method includes upon detection of a break between an output point (A) of the input pulling device and between an input point (B) of the output pulling device, a step of controlling the rotational speed of the spool to bring it to a complete stop; and a step of passing the optical fiber (Continued)

between an output point (C) of the output pulling device and an input point (D) of the winding spool in a fiber accumulation zone adapted to accumulate a predetermined fiber length preventing an fiber broken end resulting from the break going beyond the input point (D) of the winding spool.

8 Claims, 4 Drawing Sheets

(56) References Cited

FOREIGN PATENT DOCUMENTS

| WO | 99/55612 A1 | 11/1999 |
|---|---|---|
| WO | 01/46055 A1 | 6/2001 |
| WO | 02/35210 A1 | 5/2002 |

OTHER PUBLICATIONS

International Search Report for PCT/IB2015/000349 dated Oct. 21, 2015 (2 pages).

* cited by examiner

METHOD FOR CONTROLLING ROTATION OF A WINDING SPOOL OF A PROOF-TESTING MACHINE FOR OPTICAL FIBER, CORRESPONDING SYSTEM, COMPUTER PROGRAM PRODUCT AND NON-TRANSITORY COMPUTER-READABLE CARRIER MEDIUM

1. FIELD OF THE INVENTION

The invention relates to the field of proof-testing machinery. Proof-testing is a method used to eliminate defects which do not sustain the proof-test tension.

In particular, the invention relates to a technique for controlling rotation of a winding spool onto which an optical fiber is wound after being subject to a strength proof test in a proof-testing machine.

2. TECHNOLOGICAL BACKGROUND

The use of optical fiber in the telecommunications industry is becoming the industry standard for data communications. It permits transmission over longer distances and at higher bandwidths than electrical wire cables. Typically, an optical fiber is obtained by producing a primary preform (or core rod), overcladding the primary preform and drawing it to form the optical fiber. For ease of handling and shipping, the optical fiber is then wound onto a spool at high speed (also referred as shipping or winding spool).

However, before winding the optical fiber on a shipping spool, the optical fibre is subjected to a testing phase tested to assess whether the fiber is suitable for cabling. One of the most important tests conducted on optical fibres is the proof test (also known as strength or tensile test). The purpose of the proof test is to ensure that the manufactured optical fibre can stand up to the tensile stresses which can occur while the fiber is being cabled or when the cable is being installed.

Thus, before winding the optical fiber on the spool, the optical fiber is passed through a proof-testing machine that applies a predetermined level of tensile stress to the fibre. If the optical fibre is too weak in terms of mechanical strength, it breaks under stress.

In the machine, the optical fibre is first guided at high speed, typically between 1500 and 3000 m·min$^{-1}$, to an input pulling device and further to an output pulling device and then onto the shipping spool. The input and output pulling devices subject the optical fibre to a predefined value of tensile stress, as a result of which the fibre breaks if the fibre strength is insufficient. The machine also comprises several pulleys, which guide the fiber up to the spool and facilitate proper tension on the fiber as it is wound onto the spool.

During proof testing, the optical fiber is susceptible to break due to tensile stress applied by the two pulling devices on the fiber. When such a fiber break occurs, the broken fiber end tends to flail and whips around at high speed due to the high rotational speed of the spool. The uncontrolled broken end can impact the optical fiber already wound onto the spool and may cause irreversible damage to many layers of wound fiber (as the optical fiber is wound on the spool, the optical fiber is laid down onto the spool in successive layers). This phenomenon is commonly referred to as "whipping". Fiber break during the proof test is unpredictable and, following such a break, the machine must be immediately stopped to prevent whipping damage to the wound fiber. However, because the break is unpredictable and the spool cannot be stopped instantaneously (basically because of its inertia), there is a period of time during which the spool will continue to rotate and the broken end can whip against the fiber already wound onto the spool, thus causing damage to the fiber.

Several known solutions were proposed in order to prevent fiber whipping.

The patent application WO 02/35210 discloses a proof-testing machine for optical fibre that ensures a continuous pulling and proof-testing process in case of a fiber break. To that end, the fibre end is guided in the case of break between the first and the second pulling device by means of a first channel, which guides the fibre to the second pulling device. After achieving the second pulling device, the fibre end is guided into a second channel which is off the normal fibre track and along which the fibre is guided into a scrap processing system. The fibre is then guided from the second channel to the normal track, along which the fibre is guided onto a winding spool. This kind of implementation is however complex to implement. In addition, it does not enable that all optical fiber is accumulated on the spool after detecting a break, without damaging the fiber already spooled on the spool.

The patent application WO 99/55612 discloses a fiber proof-testing machine for reducing or eliminating fiber whipping phenomenon. The machine comprises a whip shield surrounding the winding spool and a fiber entry whip reducer positioned between the output pulling device and the winding spool. The entry whip reducer includes pulleys and a guide channel configured such that the broken end is maintained against the guide channel by centrifugal force imparted onto the fiber by the curvature of the channel and forward motion of the fiber produced by the spool, thereby producing a trajectory such that the loose end is maintained against the whip shield. By maintaining the broken end of the fiber against the guide channel during fiber entry, whip damage can be reduced or eliminated. In practice, however, the rotational speed of the spool is also relatively high, and so the broken end can flail on several revolutions of the spool, thereby increasing the risk that the broken end finally impacts the fiber already wound onto the spool. In other words, this solution does not ensure eliminating completely whipping phenomena. In addition, adding a fiber whip reducer adding complexity to the machine. By the way, it is complex to clean the machine and to maintain the protection shield alignment.

The patent application WO 01/46055 proposes a fiber broken end cutting apparatus arranged to separate the broken end from a wound segment to reduce fiber whip damage. An active cutting element is positioned to cut off a segment of the broken end from the optical fiber being wound onto the rotating spool, which otherwise might be caused to whip into the fiber already wound on the spool. However, a drawback of this technical solution is that it requires the addition of an active fiber cutting system relatively complex to implement in a proof-testing machine. Finally, this solution does not offer the possibility of recovering substantially all of the optical fiber without whipping.

3. GOALS OF THE INVENTION

The invention, in at least one embodiment, is aimed especially at overcoming at least some of these different drawbacks of the prior art.

More specifically, it is a goal of at least one embodiment of the invention to provide a technique for preventing whip damage caused by a broken fiber end on the optical fiber wound on the winding spool when a fiber break occurs during a strength proof test.

It is also an aim of at least one embodiment of the invention to provide a technique that ensures, after a fiber break in the proof-testing machine, substantially all fiber is accumulated on the winding spool, without fiber left on or between the pulleys of the proof-testing machine.

It is an additional goal of at least one embodiment of the invention to provide a technique of this kind that is simple to implement and costs little.

4. SUMMARY OF THE INVENTION

A particular embodiment of the invention proposes a method for controlling rotation of a winding spool onto which an optical fiber is wound in a proof-testing machine, said optical fiber being guided in the proof-testing machine at a given line speed from an input pulling device to an output pulling device, then to the winding spool, said input and output pulling device being arranged to subject said optical fiber to a predetermined tensile stress, the winding spool having a rotational speed servo-controlled on the given line speed, the method comprising a step of, upon detection of a break between an output point of the input pulling device and between an input point of the output pulling device, controlling the rotational speed of the winding spool to bring it to a complete stop. The method according to the invention is such that it comprises a step of, between an output point of the output pulling device and an input point of the winding spool, passing said optical fiber in a fiber accumulation zone adapted to accumulate a predetermined fiber length preventing an fiber broken end resulting from the break going beyond the input point of the winding spool.

Thus, upon detection of a fiber break during the strength proof test, the method according to the invention eliminates any risk of whip damage caused by the broken end on the optical fiber already wound on the spool. To that end, the method provides for passing the optical fiber in a fiber accumulation zone, acting as a "buffer zone", to absorb the optical fiber before being wound onto the spool on an accumulation length such that the broken end does not achieve the spool.

According to a particular implementation, the method comprises a step of, upon detection of a break by a first sensor, triggering a complete stop of the winding spool, and the method is such that said predetermined fiber length is superior or equal to a distance travelled by the broken end from the instant of detection of a break detected by the first sensor until the complete stop of the winding spool, minus a predefined distance travelled by the broken end between the input point and the output point of the output pulling device.

Thus, in this particular implementation, once a break is detected, the spool rotation is brought to a complete stop, the accumulation length being such that, after the break, the fiber is accumulated so that the broken end never achieves the spool, even if the break occurs, at worst, at the input of the output pulling device. The fiber accumulation zone accumulates the optical fiber on a fiber length at least equal to the distance travelled by the broken end from the instant of detection of the break until the complete stop of the winding spool. The distance between the input point and the output point of the output pulling device is also used to accumulate a fiber length.

According to a particular feature, said distance is calculated on the basis of:
  a first length of fiber accumulated during a reaction duration elapsed between the instant of detection of a break and an instant of triggering of a stop of the winding spool,
  a second length of fiber accumulated during a breaking duration elapsed between the instant of triggering of a stop and the instant the winding spool is stopped.

Thus, the predetermined fiber length is chosen in taking into account the duration for stopping the spool from the instant of detection of the break; it includes the reactivity of the intelligence implementing the method and the breaking of the spool (because of inertia of the spool in rotation, the spool takes some time to completely stop after being ordered to stop). Indeed, between the instant of detection of the break and the instant of triggering of the stop, this is all fiber that the accumulated zone must absorb, and between the instant of triggering of the stop and the instant the winding spool is completely stopped, this is also all fiber that the accumulated zone must absorb.

More particularly, the first length is a function of a predetermined maximal line speed and a predetermined reaction duration, and the second length is a function of the predetermined maximal line speed and a predetermined minimum breaking duration assuming a maximal diameter of fiber wound onto the winding spool.

According to an alternative implementation, the method comprises steps of:
  upon detection of a break by a first sensor, changing the rotational speed of the winding spool by triggering a first deceleration
  upon detection of a passage of the fiber broken end by a second sensor, changing the rotational speed of the winding spool by triggering a second deceleration, which overrules the first deceleration until the complete stop of the winding spool;

and the method is such that said predetermined fiber length is superior or equal to a distance travelled by the broken end from the instant of detection of the passage detected by the second sensor until the complete stop of the winding spool.

This alternative implementation makes it possible, in case of fiber break, to automatically retrieve a maximum of optical fiber while ensuring that the broken fiber end does not go beyond the input point of the winding spool. In other words, not only any risk of whip damage is eliminated, but substantially all the optical fiber is accumulated on the winding spool without the broken end left on or between the pulling devices of the proof-testing machine. This simplifies maintenance and cleaning of the machine in case of fiber break, as operator intervention between the pulling devices is no longer necessary. Indeed, when the spool rotation is completely stopped, the broken end can be retrieved in the fiber accumulation zone just above the input point of the winding spool.

According to a particular feature, said distance is calculated on the basis of:
  a first length of fiber accumulated during a reaction duration elapsed between the instant of detection of the passage and an instant of triggering of a second deceleration of the winding spool,
  a second length of fiber accumulated during a breaking duration elapsed between the instant of triggering of a second deceleration and the instant the winding spool is stopped.

More particularly, the first length is a function of a current line speed and a predetermined reaction duration, the second length is a function of the current line speed and a breaking duration.

According to a particular feature, the first deceleration is computed on the basis of a current line speed determined at the instant of detection of a break, a predetermined reaction duration and an assumed fiber accumulation length corresponding to the distance travelled by a broken end between the output point of the input pulling device and the input point of the winding spool.

An another embodiment, the invention pertains to a computer program product comprising program code instructions for implementing the above-mentioned method (in any of its different embodiments) when said program is executed on a computer or a processor.

In another embodiment, the invention pertains to a non-transitory computer-readable carrier medium, storing a program which, when executed by a computer or a processor causes the computer or the processor to carry out the above-mentioned method (in any of its different embodiments).

In another embodiment, the invention pertains to a system for controlling rotation of a winding spool onto which an optical fiber is wound in a proof-testing machine, said optical fiber being guided in the proof-testing machine at a given line speed from an input pulling device to an output pulling device, then to the winding spool, said input and output pulling device being arranged to subject said optical fiber to a predetermined tensile stress, the winding spool having a rotational speed servo-controlled on the given line speed, the system comprising means for detecting a break between an output point of the input pulling device and between an input point of the output pulling device. The system according to the invention is such that it comprises:
- between an output point of the output pulling device and an input point of the winding spool, a fiber accumulation zone through which passes said optical fiber and which is adapted to accumulate a predetermined fiber length preventing an fiber broken end resulting from the break going beyond the input point of the winding spool,
- a control device configured to controlling the rotational speed of the winding spool to bring it, upon activation of said detecting means, to a complete stop, as a function of the predetermined fiber length.

Advantageously, the system comprises means for implementing the steps performed in the process of control as described above, in any of its various embodiments.

5. LIST OF FIGURES

Other features and advantages of embodiments of the invention shall appear from the following description, given by way of an indicative and non-exhaustive examples and from the appended drawings, of which:

FIG. 1 provides a synoptic illustration of the principle of functioning of the system according to a particular embodiment of the invention;

FIG. 2 is a flowchart of a first embodiment of the method according to the invention;

FIG. 3 graphically depicts of an example of control of the rotational speed of the winding spool according to the first embodiment of the invention;

FIG. 4 is a flowchart of a second embodiment of the method according to the invention;

FIG. 5 graphically depicts of an example of control of the rotational speed of the winding spool according to the second embodiment of the invention;

6. DETAILED DESCRIPTION

In all of the figures of the present document, identical elements and steps are designated by the same numerical reference sign.

The general principle of the invention is based on an astute control of the rotation of the winding spool in case of a fiber break detected during proof-testing so as to prevent any whipping damage.

Figure 1:
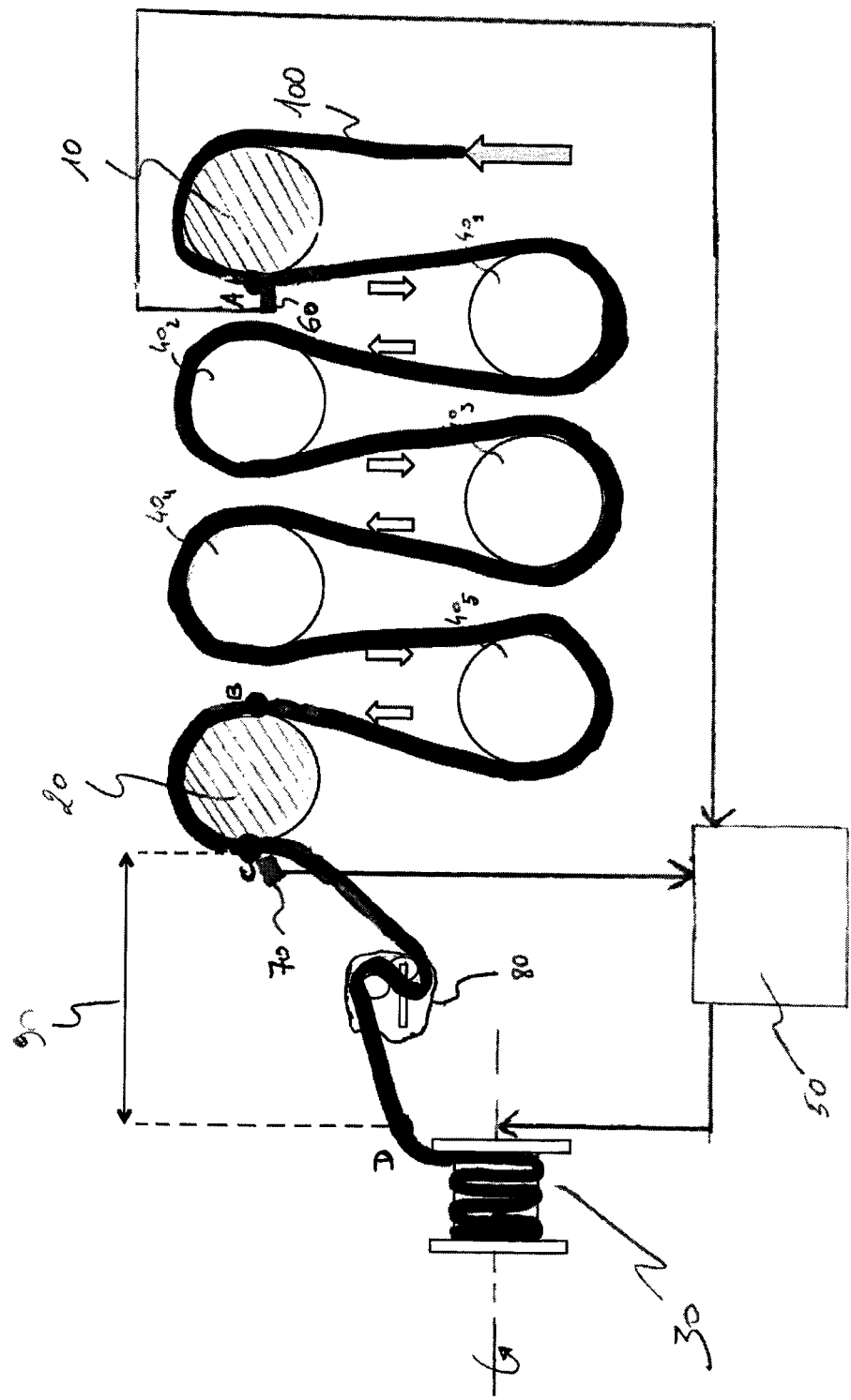

FIG. 1 depicts the principle of functioning of the proof-testing machine for optical fiber according to a particular embodiment of the invention.

The proof-testing machine comprises an input pulling device 10 and an output pulling device 20, also known as pulling capstans. The input and output capstans 10, 20 are arranged to subject the optical fiber 100 to a predetermined amount of tensile stress as a result of which the fiber breaks if its mechanical strength is insufficient.

The machine also comprises a set of five pulleys (referred as $40_1$, $40_2$, $40_3$, $40_4$, $40_5$), which guide the optical fiber 100 up between the two pulling capstans 10 and 20, apply a desired screen-test tension and facilitate proper tension on the fiber. The number of pulleys is given here just for the purposes of pedagogical description. Of course a smaller or a greater number of pulleys can be used without departing from the scope of the invention.

In order to facilitate storage, transport and deployment, the optical fiber 100 is wound at high speed onto a winding spool 30 after being subject to the proof test between the input and output capstans. The winding spool 30 is characterized by its winding diameter, winding width and its rotational speed (or winding speed).

At stead-state operation of the machine, the fiber winding is carried out at constant line speed (for example a value comprised between 1500 and 3000 m·min$^{-1}$). But the diameter onto which the fiber 100 is wound increasing with the wound fiber length, the rotational speed of the spool 30 needs to be regulated. Typically, the spool rotational speed must decrease as a function of the fiber length already wound on to the spool 30. In addition, when ups and downs of the line speed (start or stop of the machine), this rotational speed must also be regulated. Typically, the rotational speed of the spool 30 is servo-controlled on the line speed by a PID (Proportional—Integral—Derivative) regulation system. To that end, the fiber 100 passes through a dancer 80, which is consisted of two pulleys: one of which has a fixed axis and one of which has a axis movably mounted in translation. When the rotational speed is too low, the dancer 80 moves down (tension between the pulleys decreases) and when the rotational speed is too high, the dancer 80 moves up (tension between the pulleys increases). The rotational speed is thus regulated as a function of the dancer position: acceleration when the dancer 80 moves down and deceleration when the dancer 80 moves up.

The rotational speed $V_r$ can be defined as follows:

$$V_r = \frac{V_l}{p}$$

with:

$V_l$ the line speed (m·min$^{-1}$)

p the perimeter of the winding spool. The perimeter is function of the spool radius which is variable in time (the radius increasing as the quantity of fiber wound onto the spool increases).

The machine further comprises, between the output point of the output capstan 20 (referenced as point C) and the input point of the spool 30 (referenced as point D), a fiber accumulation zone 90 through which passes the optical fiber 100. This accumulation zone 90 is adapted to accumulate the fiber on a predetermined length $L_{CD}$, hereafter referred as accumulation length, preventing an fiber broken end resulting from the break going beyond the input point D of the spool 30.

We consider that point D is the limit point beyond which there is a high risk of fiber whipping.

First Embodiment

Figure 2:
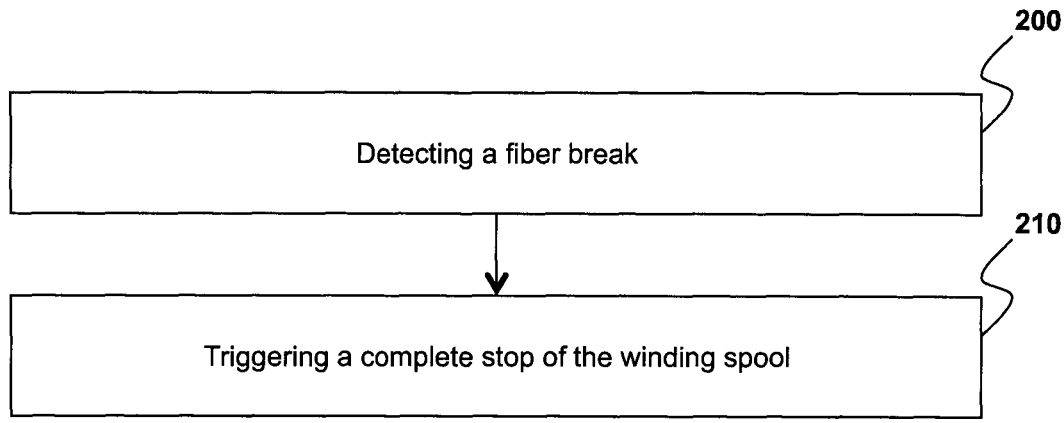

Referring now to FIG. 2 we present the method according to a first embodiment of the invention. In this embodiment, a part of the method is implemented by a control device, such as a programmable logic controller (PLC) for example. The principle of this device is described in detail below in relation with FIG. 6. The white square labelled 50 in FIG. 1 illustrates the control device according to the invention. The control device 50 is configured to control the rotational speed of the winding spool 30 to bring it to a complete stop, in order to prevent whipping damage.

For this embodiment, the proof-testing machine is equipped with an optical sensor 60 (e.g. a photo cell) placed at the output point of the input capstan 10, represented by point A. The optical sensor 60 is adapted to detect a break between the input and output capstans. It can be placed anywhere on the fiber travel between the output point of input capstan (point A) and input point of output capstan (point C).

At stead-state operation, the optical fiber 100 is guided in the proof-testing machine at a given line speed from the input capstan 10 to the output capstan 20, then passes through the accumulation zone 90, then to be wound onto the spool 30.

Upon detection of a break by the optical sensor 60 (step 200), this latter transmits a detection command to the control device 50 to warn that a break has been detected and the rotation of spool 30 shall be stopped.

Upon reception of the detection command, the control device 50 triggers a complete stop of the spool 30. To that end, the control device 50 transmits a stop command to the spool 30 in order to bring it to a complete stop (step 210). Complete stop means that the rotational speed of the spool 30 is equal to zero.

Figure 3:
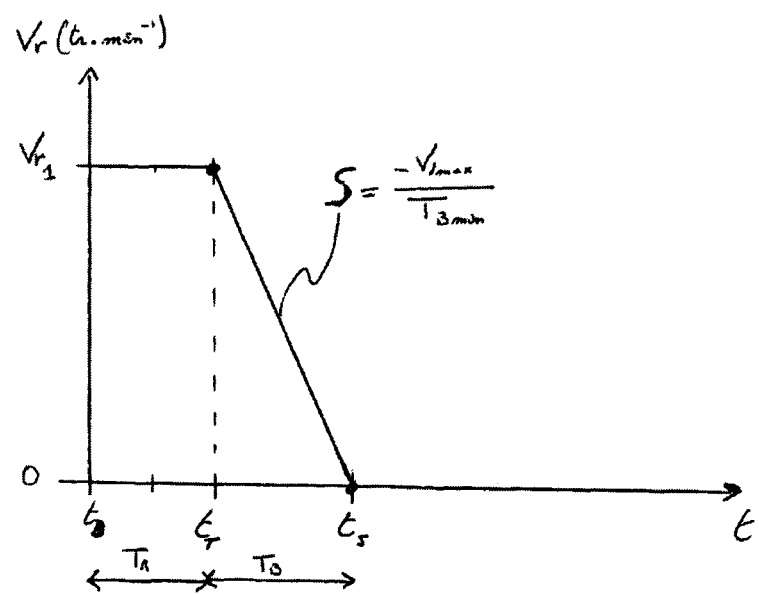

Graphic of FIG. 3 illustrates the way in which the rotational speed $V_r$ of the spool 30 is controlled by the control device 50 after detecting a break, according to the first embodiment. To simplify the description below, we consider that a fiber break occurs when the machine is in stead-state operation with a constant line speed, the spool 30 running at a given rotational speed $V_{r1}$. The break is detected by the optical sensor 60 at the instant $t_D$ and the shutdown of the spool 30 is triggered at the instant $t_T$ with a deceleration slop S. The spool 30 is stopped at the instant $t_S$.

As we can see, the spool shutdown from the instant of detection of break ($t_D$) is not instantaneous. It is necessary to take into account:

a reaction duration, $T_R$, elapsed between the instant of detection of a break, $t_D$, and the instant of triggering of a stop of the spool 30, $t_T$, a breaking duration, $T_B$, elapsed between the instant of triggering of a stop of the spool 30, $t_T$, and the instant the spool 30 is completely stopped, $t_S$.

The accumulation length ($L_{CD}$) is defined as being superior or equal to the distance travelled by the broken end from the instant of detection of a break by the sensor 60, $t_D$, until the complete stop of the spool 30, $t_S$, minus the distance travelled by the broken end between the input point B and the output point C of the output capstan 20. Thus, the accumulation length $L_{CD}$ takes into account the duration for stopping the spool from the instant of detection of the break $t_D$, including the system reaction duration and the breaking duration of the spool, and by assuming that the fiber broken end resulting from the break does not go beyond the input point D of the spool even if the break occurs, at worst, at the input point B of the output capstan 20. Indeed, between the instant $t_D$ and the instant $t_S$, this is all fiber that the accumulated zone 90 must be capable to absorb, for preventing whipping damage.

The accumulation length $L_{CD}$ is defined as follow:

$$L_{CD} = L_M + L_S - L_{BC}$$

with:

$L_M$ the length of fiber accumulated during the reaction duration $T_R$, $L_S$ the length of fiber accumulated during the breaking duration $T_B$, $L_{BC}$ the length of fiber accumulated between the points B and C, which is equal to $\pi \cdot R_c$, with $R_c$ the output capstan radius.

The system reaction duration $T_R$ is defined by the period over which the sensor 60 detects a break, sends a detection command to the control device 50, which the processes detection command and sends a stop command to the spool 30.

The breaking duration $T_B$ is defined by the period over which the control device 50 is able to brake. Because of inertia of the spool in rotation, the spool takes some time to completely stop after being ordered to stop.

The length of fiber $L_M$ is defined as follow:

$$L_M = T_R * V_{lmax}/60$$

with:

$T_R$ the reaction duration (0.030 s for example), $V_{lmax}$ the maximum line speed (for example 1800 m/min), where $$V_r = \frac{V_{lmax}}{p}.$$

The length of fiber $L_S$ is defined as follow:

$$Ls = \Sigma_{i=1}^{n}(Li) = \Sigma_{i=1}^{n}(Vim/60 * t_{sample})$$

with:

$L_i$ the length of fiber absorbed every sample time, $V_{lim}$ the average line speed between sample time i−1 and sample time i, where $V_{im} = [V_{(i-1)} + V_i]/2$ where $V_i = V_{c2} + S*t_i$, where $t_i = i*t_{sample}$, with $t_{sample}$ is the sample time for calculations (for example 6 ms) and where S is the deceleration slope applied to the spool to bring it to the complete stop.

In this particular embodiment, the device 50 acts on the spool 30 so that the breaking duration $T_B$ is minimal (for example 200 ms). Thus, upon reception of the detection command (step 210), the control device 50 applies a deceleration slope S defined as follow:

$$S = V_{lmax}/T_{Bmin}$$

with:

$V_{lmax}$ the maximum line speed (for example 1800 m/min) where $$V_r = \frac{V_{lmax}}{p}$$

$T_{Bmin}$ the minimum braking duration.

For example, for a maximum line speed $V_{lmax}$ of 1800 m/min, a reaction duration $T_R$ of 0.030 s (which corresponds to twice the PLC cycle time) and a minimum braking time $T_{Bmin}$ of 200 ms, a capstan radius of 0.16 m and assuming that the spool is full (perimeter $p = p_{max}$), the accumulation length $L_{CD}$ must be equal or superior to 4 m. In this example, rotational speed of the spool linearly decreases from the current rotational speed $Vr_1$ to zero with a deceleration slope S of −150 m/s.

Second Embodiment

Figure 4:
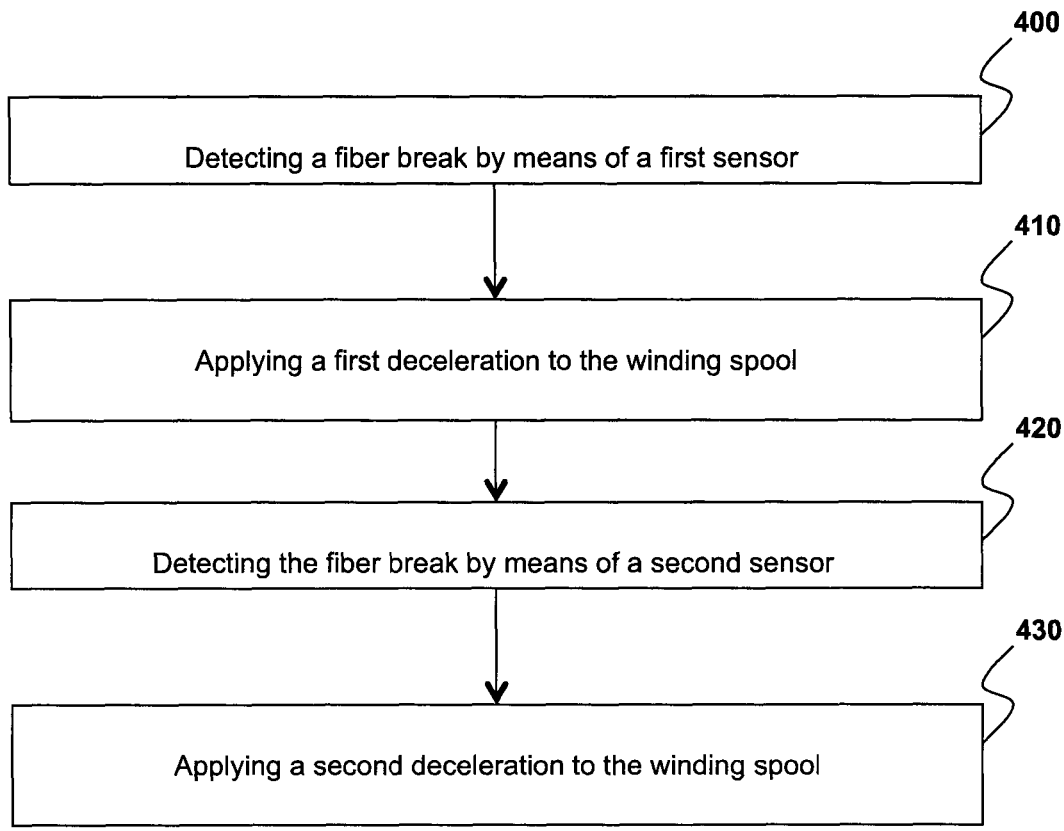

Referring now to FIG. 4 we present the method according to a second embodiment of the invention. In this embodiment, a part of the method is implemented by a control device 50, such as a programmable logic controller (PLC) for example. The control device 50 is configured to control the rotational speed of the winding spool 30 to bring it to a complete stop, in order to prevent whipping damage.

The goal of this embodiment is to eliminate any risk of whipping damage while accumulating the maximum of optical fiber on the spool, without the broken end left on or between the capstans 10 and 20.

Compared to the first embodiment, the proof-testing machine is further equipped with a second optical sensor 70 (e.g. a photo cell) placed at the output point of the output capstan 20, referred to as point C. The optical sensor 70 is adapted to detect a passage of the fiber broken end resulting from a break of the fiber 100 during the proof-test.

At stead-state operation, the optical fiber 100 is guided in the proof-testing machine at a given line speed from the input capstan 10 to the output capstan 20, then passes through the accumulation zone 90, then to be wound onto the spool 30.

Upon detection of a break by the first sensor 60, this latter transmits a break detection command to the control device 50 (step 400) to inform that a break has been detected and the rotation of spool 30 shall be stopped.

Upon reception of the break detection command, the control device 50 then transmits a first stop command to the spool 30 in order to bring it to a stop (step 410). Here, the control device 50 will change the rotational speed of the spool 30 by applying a first deceleration ($S_1$).

Then, upon detection of a passage of the broken end by the second sensor 70, this one transmits a passage detection command to the control device 50 (step 420).

Upon reception of the passage detection command, the control device 50 then transmits a second stop command to the spool 30 in order to bring it to a stop (step 430). Here, the control device 50 will change the rotational speed of the spool 30 by applying a second deceleration ($S_2$), which overrules the first deceleration until the rotation of spool 30 is completely stopped.

Figure 5:
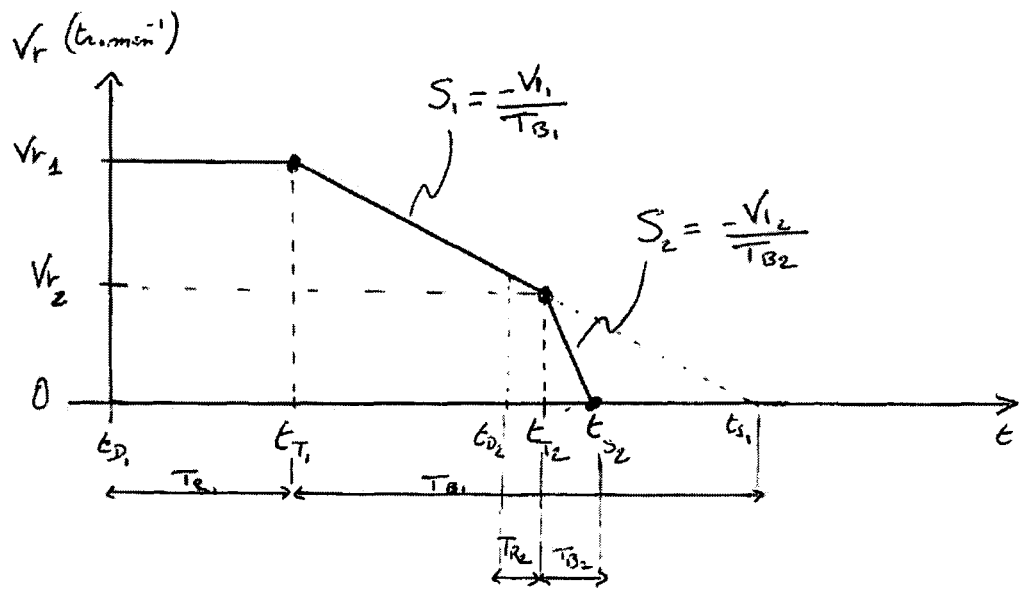

Graphic of FIG. 5 illustrates the way in which the rotational speed $V_r$ of the spool 30 is controlled by the control device 50 after detecting a break, according to the second embodiment. To simplify the description below, we consider that a fiber break occurs when the machine is in stead-state operation with a constant line speed, the spool 30 running at a given rotational speed $V_{r1}$. The break is detected by the first sensor 60 at the instant $t_{D1}$ and a shutdown of the spool 30 is triggered at the instant $t_{T1}$ with a first deceleration slope $S_1$. The passage is detected by the second sensor 70 at the instant $t_{D2}$ and a second deceleration is applied at the instant $t_{T2}$ with a second deceleration slope $S_2$, which overrules the first deceleration until the rotation of spool 30 is completely stopped. The spool 30 is stopped at the instant $t_S$ (zero rotational speed).

First Deceleration ($S_1$)

The first deceleration is applied by assuming that the fiber break occurs at the output point A of the input capstan 10. Whatever its actual position between points A and B, the first sensor 60 is able to detect a break that occurs between the two capstans 10 and 20 without precise location, which leaves a doubt as to precise location of the break. Thus, when a break is detected by the first sensor 60, the first deceleration slope $S_1$ applied to the spool 30 to bring it to stop is defined in considering that the fiber length to be accumulated onto the spool 30 ($L_{AD}$) is equal to the distance travelled by the broken end from the output point A of the input capstan 10 to the input point D of the spool 30.

The length of fiber $L_{AD}$ from the instant of detection of break is defined as follow:

$$L_{AD} = L_{M1} + L_{S1}$$

with:

$L_{M1}$ the length of fiber accumulated during the reaction duration $T_{R1}$, $L_{S1}$ the length of fiber accumulated during the breaking duration $T_{B1}$.

The reaction duration $T_{R1}$ and the breaking duration $T_{B1}$ have to be taken into consideration, as it may be all fiber to be accumulated on the spool 30 during this period of time, without any whip damage. It should be reminded that the reaction duration is the period of time elapsed between the instant of detection of a break, $t_{D1}$, and the instant of triggering of a stop of the spool 30, $t_{T1}$, and the breaking duration is the period of time elapsed between the instant of triggering of a stop of the spool, $t_{T1}$, and the instant the spool is completely stopped, $t_{S1}$.

The length of fiber $L_M$ is defined as follow:

$$L_{M1} = T_{R1} * V_{l1}/60$$

with:

$T_{R1}$ the reaction duration, $V_{l1}$ the current line speed at the instant of detection of break, where $$V_{r1} = \frac{V_{l1}}{p}.$$

The length of fiber $L_{S1}$ is defined as follow:

$$Ls_1 = \Sigma_{i=1}^{n}(Li_1) = \Sigma_{i=1}^{n}(Vim_1/60 * t_{sample})$$

with:

$L_{i1}$ the length of fiber absorbed every sample time,
$V_{im1}$ the average line speed between sample time i−1 and sample time i, where $V_{im1}=[V_{(i-1)1}+V_{i1}]/2$ where $V_{i1}=V_{l1}+S_1*t_i$, where $t_i=i*t_{sample}$, with $t_{sample}$ is the sample time for calculations (for example 6 ms) and where $S_1$ is the first deceleration slope applied to the spool 30.

$L_s$ length values are calculated for variable braking duration $T_{B1}$ in order to determine which braking duration allows absorbing the desired distance comprised between $L_{AD}$ (maximum length to be absorbed) and $L_{AD}$−0.4 m (minimum length to be absorbed). In practice, the desired distance should be as close as possible to $L_{AD}$ without creating whipping. Here, the maximum length is considered equal to $L_{AD}$ and the minimum length is a little bit less than $L_{AD}$, for example $L_{AD}$−0.4 m. This minimum length is given by way of illustration only. The skilled person will be able to adapt this value as a function of the machine used and parameters thereof.

The control device 50 acts on the spool rotation taking into account the length of fiber to be accumulated $L_{AD}$, the current line speed $V_{l1}$ at the instant of detection of a break and the reaction duration $T_{B1}$. Thus, upon reception of the detection command, the control device 50 applies a first deceleration slope $S_1$ defined as follow:

$$S_1=-V_{l1}/T_{B1}:$$

with:

$V_{l1}$ the current line speed at the instant of detection of break,
$T_{B1}$ the braking duration computed as the value for which:

$$L_{AD}-0.4\ m<L_{S1}+L_{M1}<L_{AD}.$$

For example, if proof-test machine is running at 1650 m/min, the fiber length $L_{AD}$ is 9.7 m and the reaction duration $T_{R1}$ is 40 ms, the spool 30 should be stopped between 596 ms (with $L_{AD}$−0.4 m) and 624 ms (with $L_{AD}$) for the first deceleration command.)

Second Deceleration ($S_2$)

The second deceleration $S_2$ is applied by considering that the distance still to be travelled by the broken end from the instant of detection of the passage detected by the second sensor 70 ($t_{D2}$) at point C until the complete stop of the spool 30 ($t_{S2}$), is the accumulation length $L_{CD}$ arranged in the accumulation zone 90. As the break location between the two capstans is not known, the detection of passage of the broken end by the second sensor 70 enables the control device 50 to further decelerate the spool rotation in order to ensure that the broken end, which passes through the fiber accumulation zone 90, does not go beyond the point D.

The accumulation length $L_{CD}$, according to this second embodiment, is defined as being superior or equal to the distance travelled by the broken end from the instant of detection of the passage of broken end detected by the second sensor 70 until the complete stop of the spool 30.

The accumulation length $L_{CD}$ is defined as follow:

$$L_{CD}=L_{M2}+L_{S2}$$

with:

$L_{M2}$ the length of fiber accumulated during the reaction duration $T_{R2}$, elapsed between the instant of detection of the passage $t_{D2}$ and the instant of triggering of the second deceleration $t_{T2}$,
$L_{S2}$ the length of fiber accumulated during the breaking duration $T_{B2}$, elapsed between the instant of triggering of the second deceleration $t_{T2}$ and the instant the winding spool is completely stopped $t_{S2}$.

The length of fiber $L_{M2}$ is defined as follow:

$$L_{M2}=T_{R2}*V_{l2}/60$$

with:

$T_{R2}$ the reaction duration,
$V_{l2}$ the current line speed at the instant of detection of a passage of broken end, where $$V_{l2}=\frac{V_{l2}}{p}.$$

The length of fiber $L_{S2}$ is defined as follow:

$$L_{S2}=\Sigma_{i=1}{}^n(Li_2)=\Sigma_{i=1}{}^n(Vim_2/60*t_{sample})$$

with:

$L_{i2}$ the Length of fiber absorbed every sample time,
$V_{im2}$ the average line speed between sample time i−1 and sample time i, where $V_{im2}=[V_{(i-1)2}+V_{l2}]/2$ where $V_{l2}=Vl_2+S_2*t_i$, where $t_i=i*t_{sample}$, with $t_{sample}$ is the sample time for calculations (for example 6 ms) and where $S_2$ is the second deceleration slope applied to the spool 30 to bring it to the complete stop.

The device 50 acts on the spool rotation taking into consideration the accumulation length $L_{CD}$, the current line speed $V_{l2}$ at the instant of detection of a passage of broken end and the reaction duration $T_{B2}$. Thus, upon reception of the detection command, the control device 50 applies a second deceleration slope $S_2$ defined as follow:

$$S_2=-V_{l2}/T_{B2}:$$

with:

$V_{l2}$ the current line speed at the instant of detection of a passage of broken end (for example 1200 m/min) where $$V_{l2}=\frac{V_{l2}}{p},$$

$T_{B2}$ the braking duration computed as the value for which:

$$L_{CD}-0.4\ m<L_{S2}+L_{M2}<L_{CD}$$

For example, if the proof-testing machine is running at 1200 m/min at the instant a passage of broken end is detected by the second sensor 70, the accumulation length $L_{CD}$ is 2.7 m and the reaction duration $T_{R2}$ is 4 ms, the spool 30 should be stopped between 222 ms (with $L_{AD}$−0.4 m) and 260 ms (with $L_{AD}$) for the second deceleration command.

Thus, thanks to this second embodiment, when a break occurs during proof-testing of the optical fiber 100, the proof-test machine is automatically stopped in such a way that no fiber whipping is generated on the wound fiber and most of the fiber length left between the break end and the winding spool 30 is wound on the spool 30. Thus, contrary to the first embodiment, the length of fiber wound onto the spool is optimized. This also simplifies machine maintenance and cleaning, as operator intervention between the two pulling capstans is no longer necessary.

Figure 6:
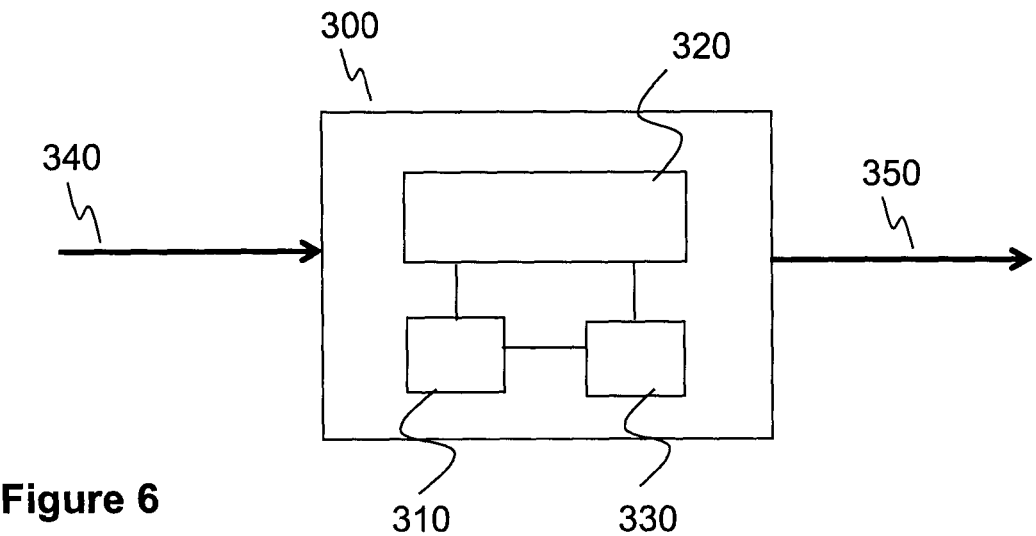
FIG. 6 shows an example of simplified structure of a control device according to a particular embodiment of the invention.

FIG. 6 shows the simplified structure of a control device (or an apparatus, or a module or a system) implementing the controlling method according to the invention (for example the first or second embodiment discussed above in relation with FIG. 2 or 4 respectively).

The device 300 comprises a non-volatile memory 310 (e.g. a read-only memory (ROM) or a hard disk), a volatile memory 330 (e.g. a random access memory or RAM) and a processor 320. The non-volatile memory 310 is a non-transitory computer-readable carrier medium. It stores executable program code instructions, which are executed by the processor 320 in order to enable implementation of the method described above (method for controlling rotation of a winding spool onto which an optical fiber is wound).

Upon initialization, the aforementioned program code instructions are transferred from the non-volatile memory 310 to the volatile memory 330 so as to be executed by the processor 320. The volatile memory 330 likewise includes registers for storing the variables and parameters required for this execution. The device 300 receives as input a detection command 340 (which can be a break detection command from the first sensor (for example step 200 of FIG. 2 or step 400 of FIG. 4) or a passage detection command from the second sensor (step 420 of FIG. 4). The device 300 generates as output a deceleration command 350 (step 210 of FIG. 2, steps 410 and 430 of FIG. 4) toward means for controlling engine of the winding spool, as a function of the detection commands 340 received in input.

All the steps of the above managing method can be implemented equally well:
- by the execution of a set of program code instructions executed by a reprogrammable computing machine such as a PC type apparatus, a DSP (digital signal processor) or a microcontroller. This program code instructions can be stored in a non-transitory computer-readable carrier medium that is detachable (for example a floppy disk, a CD-ROM or a DVD-ROM) or non-detachable; or
- by a dedicated machine or component, such as an FPGA (Field Programmable Gate Array), an ASIC (Application-Specific Integrated Circuit) or any dedicated hardware component.

It should be noted that the invention is not limited to a purely software-based implementation, in the form of computer program instructions, but that it can also be implemented in hardware form or any form combining a hardware portion and a software portion.

Figure 7:
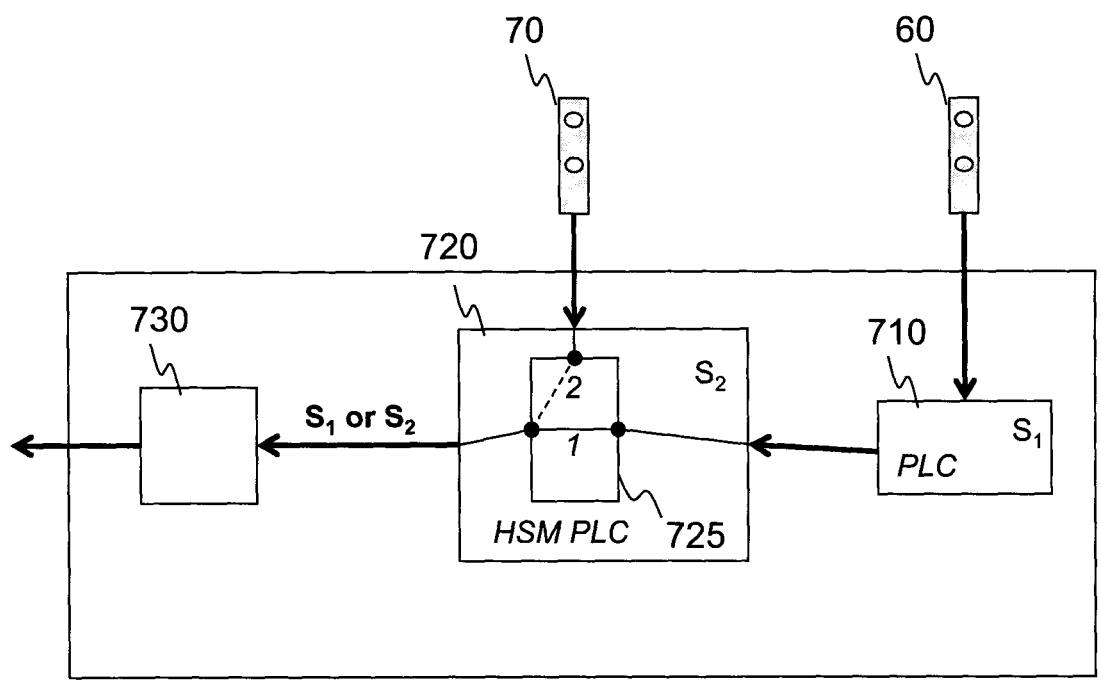
FIG. 7 shows an example of detailed structure of a control device adapted for carrying out the second embodiment of the invention.

FIG. 7 shows an example of structure of a control device adapted for carrying out the second embodiment of the invention. In that embodiment, the control device comprises two distinct programmable logic controllers (PLCs): a first PLC 710 cooperating with the first sensor 60, specifically dedicated to the break detection, and a second PLC 720 (or any other dedicated electronic control device) cooperating with the second sensor 70, specifically dedicated to the broken end passage detection and speed control of the winding spool 30. The second PLC 720 (referred as HSM PLC on Figure for "High Speed Micro PLC") has a very short reaction time (0.002 s), much lower than that of the first PLC 710 (0.020 s). This enables to react more rapidly on detection of a passage of broken end at point C. The control device further comprises a speed controller 730 configured to control the speed of rotation of the spool 30 as a function of the command signals received as input.

The second PLC 720 comprises a commutation means 725 having two positions: a position "1" in which the first PLC 710 is directly connected to the speed controller 730 via the second PLC 720 and a position "2" in which the second PLC 720 is directly connected to the speed controller 730 via the second PLC 720. Position "1" is activated upon detection of a break by the sensor 60 and position "2" is activated upon detection of a passage of broken end by the sensor 70.

Upon detection of a break by the sensor 60, a break detection command is sent to the PLC 710 (step 400) to inform that a break has been detected. Upon reception of the break detection command, the PLC 710 transmits a first stop command, including the first deceleration slope $S_1$ to be applied to the spool 30, to the speed controller 730 via the PLC 710 (step 410), the commutation means being in position "1".

Upon detection of a passage of the broken end by the second sensor 70, this one transmits a passage detection command to the PLC 720 (step 420). Upon reception of the passage detection command, the PLC 720 transmits a second stop command, including the first deceleration slope $S_2$ to be applied to the spool 30, to the speed controller 730 in order to stop the spool 30 as quickly as possible (step 430), the commutation means being in position "2". In other words, the speed controller 730 is driven either by the PLC 710 or the HSM PLC 720.

Although the present disclosure has been described with reference to one or more examples, workers skilled in the art will recognize that changes may be made in form and detail without departing from the scope of the disclosure and/or the appended claims.

The invention claimed is:

1. A method for controlling rotation of a winding spool onto which an optical fiber is wound in a proof-testing machine, said optical fiber being guided in the proof-testing machine at a given line speed from an input pulling device to an output pulling device, then to the winding spool, said input and output pulling device being arranged to subject said optical fiber to a predetermined tensile stress, the winding spool having a rotational speed servo-controlled on the given line speed, the method comprising a step of:
    upon detection of a break between an output point of the input pulling device and between an input point of the output pulling device, controlling the rotational speed of the winding spool to bring the winding spool to a complete stop, and
    between an output point of the output pulling device and an input point of the winding spool, passing said optical fiber in a fiber accumulation zone adapted to accumulate a predetermined fiber length preventing an fiber broken end resulting from the break going beyond the input point of the winding spool
    upon detection of a break by a first sensor, changing the rotational speed of the winding spool by triggering a first deceleration;
    upon detection of a passage of the fiber broken end by a second sensor, changing the rotational speed of the winding spool by triggering a second deceleration, which overrules the first deceleration until the complete stop of the winding spool;
    and said predetermined fiber length is superior or equal to a distance travelled by the broken end from the instant of detection of the passage detected by the second sensor until the complete stop of the winding spool.

2. The method according to claim 1, wherein said distance is calculated on the basis of:
    a first length of fiber accumulated during a reaction duration elapsed between the instant of detection of the passage and an instant of triggering of a second deceleration of the winding spool,
    a second length of fiber accumulated during a breaking duration elapsed between the instant of triggering of a second deceleration and the instant the winding spool is stopped.

3. The method according to claim 2, wherein:
    the first length is a function of a current line speed and a predetermined reaction duration, the second length is a function of the current line speed and a breaking duration.

4. The method according to claim 1, wherein the first deceleration is computed on the basis of a current line speed determined at the instant of detection of a break, a predetermined reaction duration and an assumed fiber accumulation length corresponding to the distance travelled by a broken end between the output point of the input pulling device and the input point of the winding spool.

5. A computer program product comprising program code instructions for implementing the method according to claim 1, when said program is executed on a computer or a processor.

6. A non-transitory computer-readable carrier medium storing a computer program product according to claim 5.

7. A system for controlling rotation of a winding spool onto which an optical fiber is wound in a proof-testing machine, said optical fiber being guided in the proof-testing machine at a given line speed from an input pulling device to an output pulling device, then to the winding spool, said input and output pulling device being arranged to subject said optical fiber to a predetermined tensile stress, the winding spool having a rotational speed servo-controlled on the given line speed, the system comprising:
  means for detecting a break between an output point of the input pulling device and between an input point of the output pulling device said means comprising a first sensor and a second sensor; and
  between an output point of the output pulling device and an input point of the winding spool, a fiber accumulation zone through which passes said optical fiber and which is adapted to accumulate a predetermined fiber length preventing an fiber broken end resulting from the break going beyond the input point of the winding spool,
  a control device configured to:
    upon detection of a break by said first sensor, change rotational speed of the winding spool by triggering a first deceleration;
    upon detection of a passage of the fiber broken end by said second sensor, change the rotational speed of the winding spool by triggering a second deceleration, which overrules the first deceleration until the complete stop of the winding spool;
  and said fiber accumulation zone is adapted to accumulate said predetermined fiber length which is superior or equal to a distance travelled by the broken end from the instant of detection of the passage detected by the second sensor until the complete stop of the winding spool.

8. The system of claim 7, wherein the first sensor is located between an output point of the input pulling device and an input point of the output pulling device, and the second sensor is located at an output point of the output pulling device.

* * * * *